June 16, 1964 G. R. ASCHAUER 3,137,236
PRESSURE CONTROL FOR FLUID SYSTEMS
Filed March 13, 1963 3 Sheets-Sheet 1

Inventor
George R. Aschauer
By John O. Dailey
Attorney.

June 16, 1964   G. R. ASCHAUER   3,137,236
PRESSURE CONTROL FOR FLUID SYSTEMS
Filed March 13, 1963   3 Sheets-Sheet 2

Inventor.
George R. Aschauer.
By John W. Darley
Attorney

June 16, 1964      G. R. ASCHAUER      3,137,236
PRESSURE CONTROL FOR FLUID SYSTEMS
Filed March 13, 1963      3 Sheets—Sheet 3

Inventor:
George R. Aschauer,
By John W. Darley
Attorney.

United States Patent Office 3,137,236
Patented June 16, 1964

3,137,236
PRESSURE CONTROL FOR FLUID SYSTEMS
George R. Aschauer, Racine, Wis., assignor to Twin Disc
Clutch Company, Racine, Wis., a corporation of
Wisconsin
Filed Mar. 13, 1963, Ser. No. 264,851
8 Claims. (Cl. 103—35)

My invention relates to an automatically responsive, pressure control for fluid systems.

By way of specific disclosure only, a typical example of such a system is one which serves to distribute water in a building. There are several problems inherent in a system of this type, namely, it is usually supplied by a city main in which the pressure is subject to fluctuation, the system itself may be subject to widely varying demands, and there may be situations involving both of these factors.

One known arrangement for such a system includes a motor running at constant speed and connected to a centrifugal pump for boosting the pressure in the associated system above that of the city main pressure. With all service outlets of the system closed, it is apparent that such outlets will be subjected to a pressure higher than required and while the horsepower demand is reduced to some extent, the reduction is not what it should be. Another known arrangement provides for an intermittent operation of the motor under the control of a pressure sensitive switch operably related to a tank containing air under pressure. In neither of these instances is a constant head maintained in the system.

The control features of the invention are not restricted to a building water system, but are also applicable to fluid systems generally, including those of the liquid and gaseous types. This consideration stems from the use of a variable capacity, friction clutch interposed between a constant speed motor and a centrifugal pump in the case of a liquid system. The torque required to drive such a pump is proportional to the square of the pump speed and this speed can be determined under varying conditions in the liquid system by adjusting the capacity of the clutch, i.e., by varying the intensity of friction contact in the clutch. The same consideration applies where the load is a fan, propeller or an hydraulic torque converter impeller since these devices exhibit the same torque characteristic as a centrifugal pump.

It is accordingly one object of the invention to provide a pressure control for a fluid system which maintains a substantially constant head therein irrespective of pressure fluctuations in the fluid sources or demand variations in the system.

A further object is to provide a control of the character indicated having auxiliary system means which includes a booster pump means forming a part of the fluid system and which is driven by a constant speed power source through a friction clutch whose intensity of contact engagement and hence the speed of the pump means varies with pressure fluctuations on the discharge side of the pump means.

A further object is the provision of a pressure control having the above characteristics in which the engaging force for the friction clutch is a composite of centrifugal force, the thrust of constantly acting springs and the fluid pressure in the associated system, variations in the latter being the major factor determining operation of the control.

Figure 1:
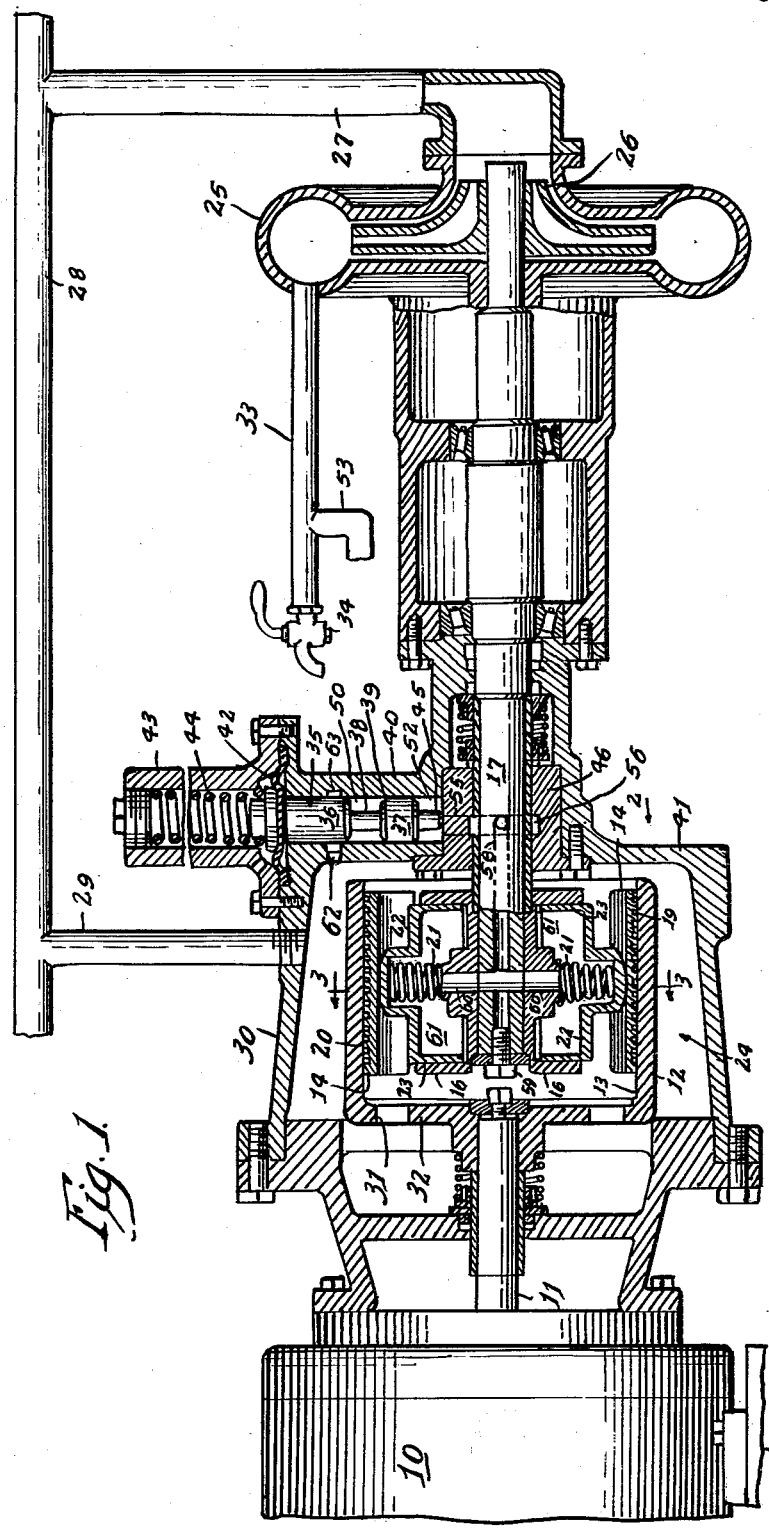
FIG. 1 is a sectional, partially schematic elevation of the pressure control shown in a rest position.
Figure 3:
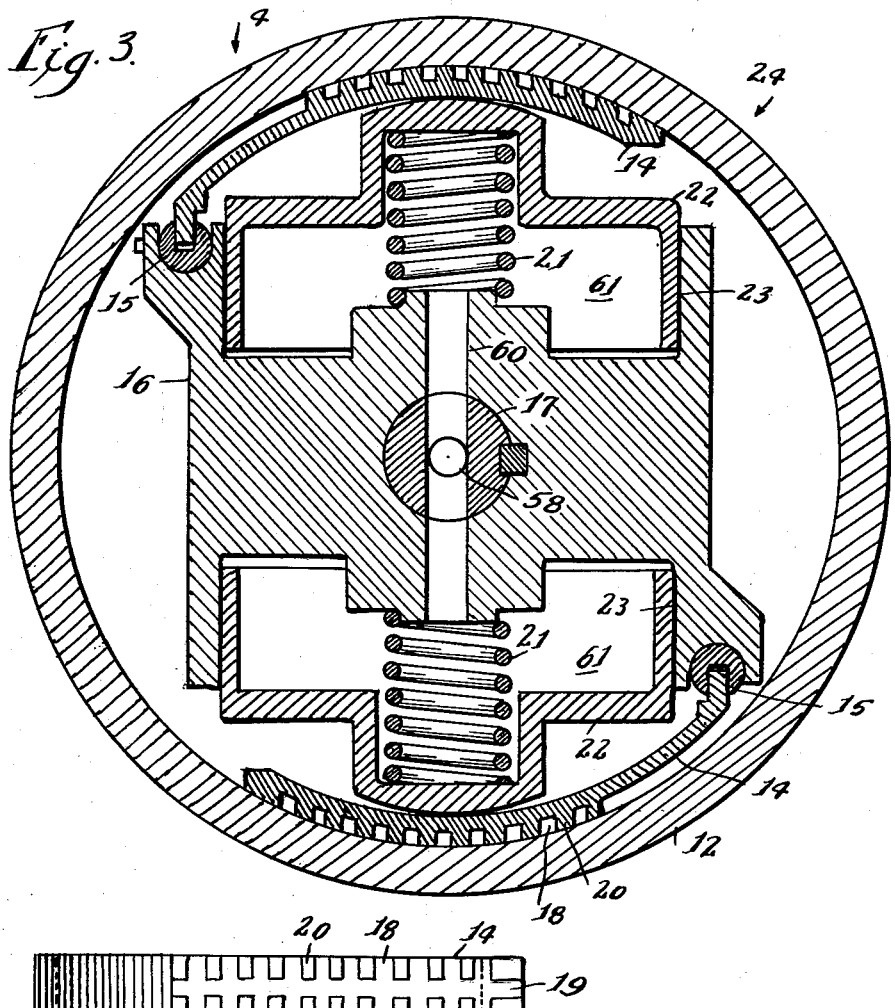
FIG. 3 is an enlarged section along the line 3—3 in FIG. 1.
Figure 4:
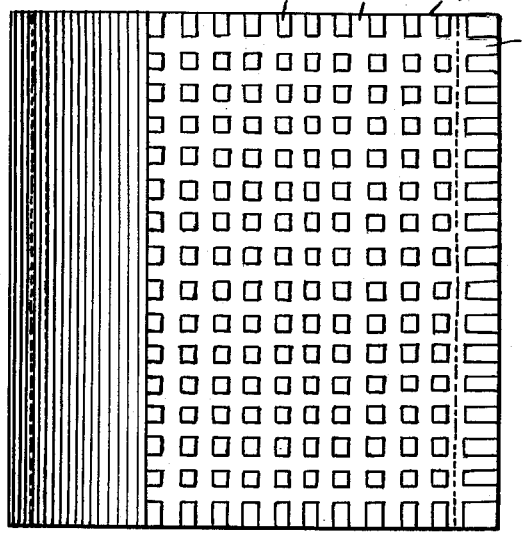
FIG. 4 is a plan view of the fraction face of a clutch shoe looking in the direction of the arrow 4 in FIG. 3.

Referring to FIG. 1, the numeral 10 designates a constant speed power source, such as an induction motor by way of example, which drivably connects through a shaft 11 with an annular shell 12 that is open at the right end as viewed in FIG. 1 and whose internal surface 13 provides friction area for the clutch presently described. The surface 13 is frictionally engaged by diametrally opposed, clutch shoes 14—14. As shown in FIG. 3, each of the shoes 14 has an arcuate shape and is pivoted at one end 15 to a hub 16 that is appropriately keyed or otherwise connected to one end of an output shaft 17. To insure cool operation, the outer surface of each shoe 14 is preferably recessed by a plurality of grid related grooves 18 and 19 to thereby define a plurality of spaced and protruding, friction bosses 20 for coacting with the shell surface 13, each boss 20 having a limited working area. As indicated in FIG. 3, the shoes 14 are pivoted respectively on the hub 16 so that, considering a clockwise rotation of the hub 16, the shoes 14 will be moved by centrifugal action into contact with the shell surface 13 with an intensity dependent upon the rotative speed of the hub 16.

Each shoe 14 is constantly biased into contact with the surface 13 by a helical spring 21 whose opposite ends are respectively seated on the hub 16 and bear against a follower 22 that applies pressure to the shoe 14 in an outward thrusting direction. Each follower 22 is slidably and substantially sealably mounted in a pocket 23 formed in the hub 16. The spring 21 and follower 22 for one shoe 14 are diametrally related to the identical parts for the other shoe 14 and these parts, together with the shell 12 and hub 16, will be collectively referred to hereinafter as the clutch 24.

The output shaft 17 connects with a conventional, centrifugal pump 25 whose inlet 26 is supplied with water through a pipe 27 that connects with a principal supply pipe 28 for conveying water under pressure, such as a city main. A pipe 29 also connects the main supply pipe 28 with the interior of a closed housing 30 within which the clutch 24 operates. The housing 30 and shell 12 are therefore always filled with water at whatever pressure then exists in the main supply pipe 28 and circulation through the shell 12 may be provided by a suitable number of apertures 31 in the end wall 32 of the shell 12. The pump 25 discharges through a pipe 33 to a faucet 34 which typify the distribution system serviced by the pump 25 and pressure variations in the latter system are utilized to control the output of the pump 25 to maintain a substantially constant pressure in the system.

Figure 2:
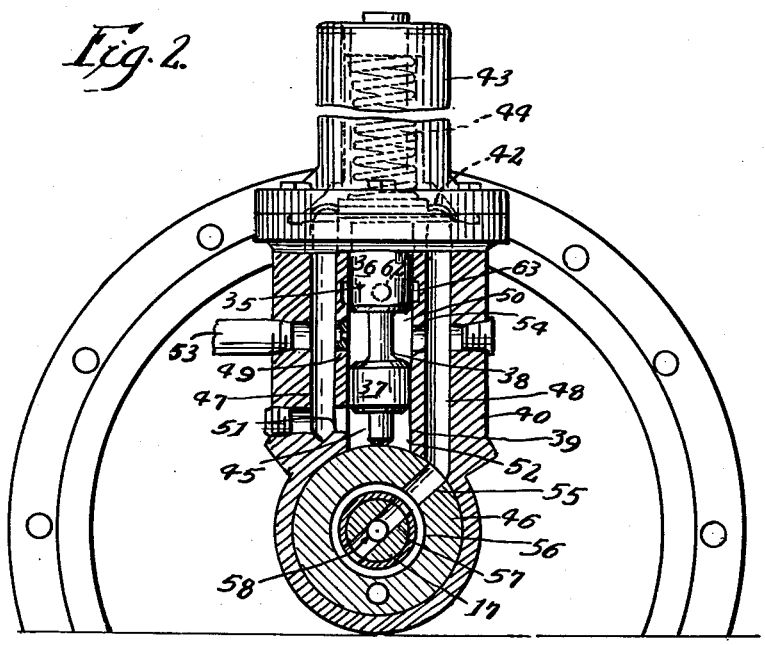
FIG. 2 is an enlarged, sectional, end view of the control looking in the direction of the arrow 2 in FIG. 1.

Referring to FIGS. 1 and 2, a spool type, control valve 35, including lands 36 and 37 spaced by a neck 38, is slidably mounted in a generally radially extending bore 39 provided in an enlarged part 40 of the housing end wall 41. The upper end of the land 36, as viewed in the drawings, abuts a diaphragm 42 whose periphery is clamped between the enlarged part 40 and an elongated cover 43 which houses an appropriately loaded, regulating spring 44. The spring 44 constantly loads the control valve 35 and biases it to the stop position shown in FIGS. 1 and 2 wherein a stem 45, which extends from the land 37, abuts a stationary bushing 46 that is coaxial with the shaft 17 and fits within the enlarged part 40.

Also included in the enlarged part 40 are generally radially extending passages 47 and 48. The passage 47 constantly communicates through an orifice 49 with the portion 50 of the bore 39 included between the lands 36 and 37 and also through a passage 51 with a portion 52 of the bore 39 in which the stem 45 is located. The passage 47 also constantly communicates with a pipe 53 which connects with the distribution system pipe 33 (see FIG. 1) and the bore portion 50 connects through a passage 54 with the passage 48 and the latter connects with one end of a radial passage 55 in the bushing 46. The other end of the passage 55 connects successively through an annular channel 56 recessed in the bushing 46 and a radial passage 57 in the shaft 17 with one end of an axial passage 58 which is also located in the shaft 17. The opposite end of the passage 58 is closed by a plug 59 and intermediately of the passage 58, oppositely disposed, radially extending passages 60—60 extend through the shaft 17 and hub 16 to provide communication between the passage 58 and chambers 61—61, each chamber 61 being included between the hub 16 and associated follower 22. A discharge port 62 also connects the bore 39 through an annular channel 63 recessed in the wall of the bore with the interior of the housing 30 and, in the position of parts shown in FIGS. 1 and 2, the channel 63 is masked by the valve land 36.

In describing the operation of the control, it is convenient to first consider the situation with all parts at rest and the usual pressure existing in the city main 28. This pressure is effective inside the housing 30, within the shell 12, the passages above referred to in the hub 16 and shaft 17, the bore portions and passages also referred to above in the enlarged part 40, the chambers 61—61, and inlet to the pump 25. Also, under the stated condition, the control valve 35 is biased by the spring 44 against the city main pressure in the bore portion 52 to the inner or stop position shown in FIGS. 1 and 2 and wherein the land 36 masks the discharge port 62. The clutch shoes 14—14 are maintained in contact with the shell 12 by the springs 21—21 which have a starting characteristic and also by whatever pressure exists in the city main 28 acting through the pipes and passages referred to above leading to the chambers 61—61.

The intensity of contact of the clutch shoes 14—14 with the shell 12 in the rest condition, due to the springs 21—21 and the city main pressure is such that when the motor 10 is started, the clutch shoes 14—14 slip but transmit torque to the shaft 17 sufficient to actuate the pump 25. Primary dependence is placed on the springs 21 to provide the slip condition of the clutch 24 at start and under running conditions until the fluid pressure in the distribution system attains a determined value. The water pressure in the distribution system 33 then is the summation of the city main and pump pressures and either before or when the motor 10 attains full speed, the pressure acting on the clutch shoes 14—14 may be sufficient to force them into full torque transmitting engagement with the shell 12, this pressure being enhanced by the effect of centrifugal force on the shoes 14—14. The water pressure is also active in the bore portion 52 against the land 37 in a direction opposite to the pressure exerted by the regulating spring 44.

When the pressure in the distribution system 33 exceeds the limiting value determined by the regulating spring 44, the control valve 35 moves upwardly, as viewed in FIG. 1, until the land 36 uncovers the annular channel 63. Accordingly, the pressure in the distribution system 33 is relieved to the housing 30 wherein the pressure is always that in the city main 28 and the water pressure in the chambers 61—61 is likewise reduced. Due to the reduced engaging pressure of the clutch 24, the latter slips and the output of the pump 25 is reduced until the pressure in the distribution system 33 falls below the regulation of the spring 44. The control valve 35 then shifts to the position shown in FIG. 1 and the cycle is resumed.

Figure 5:
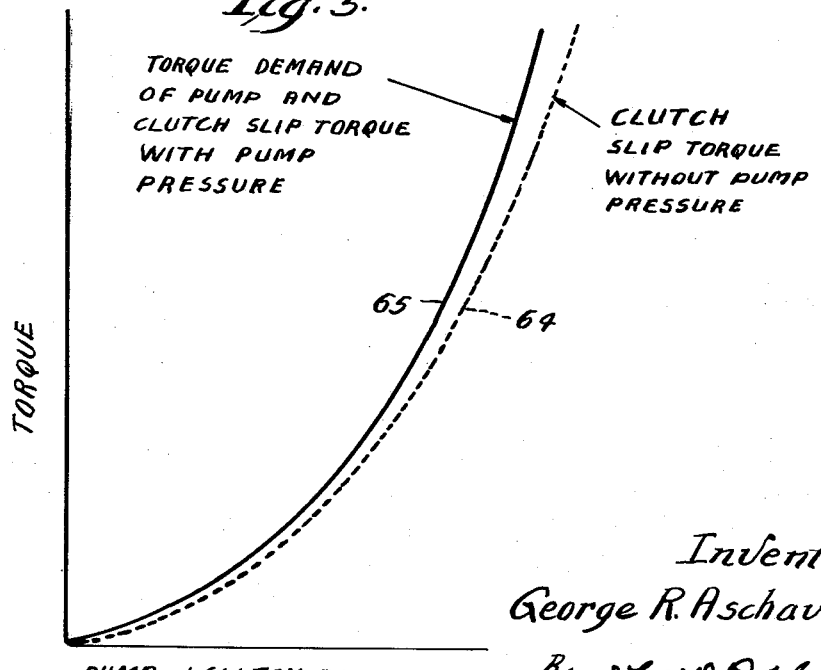
FIG. 5 shows characteristic curves indicating the relation between the clutch slip torque without water pressure and the torque demand of the pump and clutch with water pressure.

By the use of the control, a determined pressure is substantially maintained in the distribution system 33 regardless of demand fluctuations therein. The motor 10 runs at constant speed and the slipping clutch control on the torque transmitted to the pump 25 insures a decrease in pressure and power demand at the control point. The operation as regards torque requirements is graphically shown in FIG. 5 wherein the curves 64 and 65, as indicated by the legends, portray the necessity for the added water pressure supplied by the pump 25.

I claim:

1. A pressure control for a fluid system supplied by an external pressure source comprising pumping means connectively interposed between the system and source to increase the pressure in the system, a constant speed power source, a friction clutch including friction elements and loading spring means therefor for providing a slip driving connection between the power source and pumping means, means actuated by the fluid system pressure to further load the friction elements and increase the torque transmitted by the clutch, and means responsive to a predetermined fluid pressure in the system for relieving the pressure acting against the further load means and thereby restore the clutch to the slip condition.

2. A pressure control as defined in claim 1 wherein the friction elements comprise an annular shell connected to the power source and a plurality of arcuate shoes connected to the pumping means and movable outwardly of the clutch to engage the annular shell.

3. A pressure control as defined in claim 2 wherein each clutch shoe is pivotally mounted at one end thereof and swingable by centrifugal action to assist the engagement of the shoe with the shell.

4. A pressure control for a fluid system supplied by an external pressure source comprising pumping means connectively interposed between the system and source to increase the pressure in the system, a constant speed power source, a stationary housing having a chamber arranged for constant communication with the pressure source, a friction clutch rotatable within the chamber and including friction elements and loading spring means therefor for providing a slip driving connection between the power source and pumping means, means actuated by the fluid system pressure to further load the friction elements and increase the torque transmitted by the clutch, and means having a connection with the chamber and responsive to a predetermined fluid pressure in the system for relieving to the chamber the pressure acting against the further load means and thereby restore the clutch to the slip condition.

5. A pressure control as defined in claim 4 wherein the friction elements comprise an annular shell connected to the power source and a plurality of arcuate clutch shoes connected to the pumping means and movable outwardly of the clutch to engage the annular shell.

6. A pressure control as defined in claim 5 wherein each clutch shoe is pivotally mounted at one end thereof and swingable by centrifugal action to assist the engagement of the shoe with the shell.

7. A pressure control for a fluid system supplied by an external pressure source comprising pumping means connectingly interposed between the system and source to increase the pressure in the system, a constant speed power source, a friction clutch including an annular shell connected to the power source, a hub connected to the pumping means and having diametrally related, outwardly extending pockets, diametrally related, clutch shoes operatively associated with the pockets, respectively, a follower slidable in each pocket and engageable with an associated shoe and loading spring means interposed between the hub and each follower to provide a slip driving connection between the power source and pumping means, means communicating the fluid system with the pockets whereby the fluid system pressure further loads the followers, and means responsive to a predetermined fluid pressure in the system for relieving the system pressure acting against the followers to thereby restore the clutch to the slip condition.

8. A pressure control as defined in claim 7 wherein each clutch shoe is pivotally mounted at one end thereof on the hub and swingable by centrifugal action to assist the engagement of the shoe with the shell.

No references cited.